United States Patent
Li et al.

(10) Patent No.: US 11,332,247 B2
(45) Date of Patent: May 17, 2022

(54) ATOMIZING DISC, ATOMIZING DEVICE WITH ATOMIZING DISC, AND UNMANNED AERIAL VEHICLE

(71) Applicant: GUANGZHOU XAIRCRAFT TECHNOLOGY CO., LTD., Guangdong (CN)

(72) Inventors: Jiesun Li, Guangdong (CN); Shenghua Li, Guangdong (CN)

(73) Assignee: GUANGZHOU XAIRCRAFT TECHNOLOGY CO., LTD., Guangdong (CN)

( * ) Notice: Subject to any disclaimer, the term of this patent is extended or adjusted under 35 U.S.C. 154(b) by 249 days.

(21) Appl. No.: 16/606,747

(22) PCT Filed: Jun. 28, 2018

(86) PCT No.: PCT/CN2018/093395
§ 371 (c)(1),
(2) Date: Oct. 19, 2019

(87) PCT Pub. No.: WO2019/011131
PCT Pub. Date: Jan. 17, 2019

(65) Prior Publication Data
US 2020/0122833 A1  Apr. 23, 2020

(30) Foreign Application Priority Data

Jul. 11, 2017  (CN) .......................... 201710560279.2

(51) Int. Cl.
*B64D 1/18*  (2006.01)
*B05B 3/10*  (2006.01)
(Continued)

(52) U.S. Cl.
CPC .............. *B64D 1/18* (2013.01); *B05B 3/1014* (2013.01); *B05B 3/1021* (2013.01);
(Continued)

(58) Field of Classification Search
CPC .......... B05B 3/10–1028; B05B 7/2491; B05B 13/005; B64D 1/18; B64C 39/024; B64C 2201/12
(Continued)

(56) References Cited

U.S. PATENT DOCUMENTS 2,159,400 A * 5/1939 Preston ................. B05B 3/1007
239/222.11
2,850,322 A * 9/1958 Ingram ................. B05B 3/1057
239/222
(Continued)

FOREIGN PATENT DOCUMENTS

CN  101254490 A  9/2008
CN  105233304 A  1/2016
(Continued)

*Primary Examiner* — Cody J Lieuwen
(74) *Attorney, Agent, or Firm* — Shumaker, Loop & Kendrick, LLP; James D. Miller

(57) ABSTRACT

An atomizing disc, an atomizing device with the atomizing disc, and an unmanned aerial vehicle are provided. The atomizing disc includes: a bottom disc, an upper surface of the bottom disc being provided with a liquid inlet space; and a plurality of ribs, the plurality of ribs being disposed on the upper surface of the bottom disc and being spaced apart in a circumferential direction of the bottom disc. A centrifugal flow passage in communication with the liquid inlet space is defined between two adjacent ribs and the bottom disc. An end of a rib close to an edge of the bottom disc is provided with a first groove penetrating a side portion of the rib so as to cut fluid flowing through the centrifugal flow passage.

18 Claims, 5 Drawing Sheets

(51) Int. Cl.
*B05B 13/00* (2006.01)
*B05B 7/24* (2006.01)
*B64C 39/02* (2006.01)

(52) U.S. Cl.
CPC .......... *B05B 13/005* (2013.01); *B05B 7/2491* (2013.01); *B64C 39/024* (2013.01); *B64C 2201/12* (2013.01)

(58) Field of Classification Search
USPC .................................................. 239/223, 224
See application file for complete search history.

(56) References Cited

U.S. PATENT DOCUMENTS

| | | | |
|---|---|---|---|
| 3,250,473 A | | 5/1966 | Hege |
| 5,226,605 A | * | 7/1993 | Bazergui ............... B05B 3/1028 239/1 |
| 2015/0079255 A1 | * | 3/2015 | Mitchell ............... B05B 3/0463 426/388 |
| 2015/0102127 A1 | * | 4/2015 | Bentley ................ B05B 3/1021 239/222 |
| 2017/0152843 A1 | * | 6/2017 | Bei ....................... B64C 39/024 |

FOREIGN PATENT DOCUMENTS

| | | |
|---|---|---|
| CN | 205495915 U | 8/2016 |
| CN | 106216119 A | 12/2016 |
| CN | 107234013 A | 10/2017 |
| CN | 206951440 U | 2/2018 |
| GB | 277912 A | 9/1927 |
| JP | H09276752 A | 10/1997 |
| JP | 2012170837 A | 9/2012 |

\* cited by examiner

ATOMIZING DISC, ATOMIZING DEVICE WITH ATOMIZING DISC, AND UNMANNED AERIAL VEHICLE

CROSS-REFERENCE TO RELATED PATENT APPLICATIONS

This patent application is a United States national phase patent application based on PCT/CN2018/093395 filed on Jun. 28, 2018, which claims the benefit of Chinese Patent Application No. 201710560279.2, filed on Jul. 11, 2017, the disclosures of which are hereby incorporated herein by reference in their entireties.

TECHNICAL FIELD

The present disclosure relates to a technical field of unmanned aerial vehicles, and more particularly to an atomizing disc, an atomizing device with the atomizing disc, and an unmanned aerial vehicle.

BACKGROUND

When an unmanned aerial vehicle of a related art is in operation, an atomizing disc rotates with a motor at a high speed, so that a liquid medicine in the atomizing disc is extracted from a peripheral surface of the atomizing disc by a centrifugal force, and is refined into droplets in air. When the unmanned aerial vehicle of the related art is in operation, an average particle size of the droplets discharged from the atomizing disc is large, so that a spraying range of the atomizing disc is small, and a spraying effect of the atomizing disc is affected.

SUMMARY

Some embodiments of the present disclosure aim to solve at least one of the technical problems existing in the existing technology. In view of this, an embodiment of the present disclosure provides an atomizing disc, which causes the particle size of discharged droplets to be smaller and causes spraying to be more uniform, thereby improving the spraying effect of the atomizing disc.

Some embodiments of the present disclosure also provide an atomizing device, which includes the aforementioned atomizing disc.

Some embodiments of the present disclosure also provide an unmanned aerial vehicle including the aforementioned atomizing device.

The atomizing disc according to embodiments in a first aspect of the present disclosure includes: a bottom disc, an upper surface of the bottom disc being provided with a liquid inlet space; and a plurality of ribs, the plurality of ribs being disposed on the upper surface of the bottom disc and being spaced apart in a circumferential direction of the bottom disc. A centrifugal flow passage in communication with the liquid inlet space is defined between two adjacent ribs and the bottom disc. An end, close to an edge of the bottom disc, of each of the plurality of ribs is provided with a first groove penetrating a side portion of the rib so as to cut fluid flowing through the centrifugal flow passage.

The atomizing disc according to the embodiments of the present disclosure is provided with the first groove penetrating the side of the rib at one end of the rib close to the edge of the bottom disc, so that the particle size of droplets discharged from the atomizing disc is smaller, and spraying is more uniform, thereby improving the spraying effect of the atomizing disc.

According to some embodiments of the present disclosure, each of the plurality of ribs is of an arc shape, the atomizing disc includes a plurality of first grooves, and each of the plurality of first grooves penetrates a side, away from a center of curvature of a ribs corresponding to each of the plurality of first grooves, of a corresponding rib in the plurality of ribs.

In some embodiments of the present disclosure, the first groove is arranged obliquely with respect to the bottom disc, and each of the plurality of first grooves gradually extends away from the bottom disc in a direction from a side of the first groove away from the center of curvature of the corresponding rib to a side of the first groove close to the center of curvature of the rib.

In some embodiments of the present disclosure, each of the plurality of ribs is linear.

In some embodiments of the present disclosure, the first groove is arranged obliquely with respect to the bottom disc.

In some embodiments of the present disclosure, an opening of an end, close to the bottom disc, of each of the first grooves is smaller than an opening, away from the bottom disc, of each of the first grooves.

In some embodiments of the present disclosure, each of the first grooves includes a first wall and a second wall opposite to each other, the first wall and the second wall are adjacent to the end of the corresponding rib with the first groove, the second wall is close to the upper surface of the bottom disc with respect to the first wall, and the second wall extends away from a center of the bottom disc and close to the upper surface of the bottom disc.

In some embodiments of the present disclosure, each of the first grooves on the plurality of ribs penetrates two opposite sides of a corresponding rib in the plurality of ribs.

In some embodiments of the present disclosure, each of the plurality of ribs is provided with a plurality of first grooves sequentially arranged in a thickness direction of a corresponding rib in the plurality of ribs.

In some embodiments of the present disclosure, an outlet end of the centrifugal flow passage is provided with a plurality of second grooves, wherein the plurality of second grooves are sequentially arranged in the circumferential direction of the bottom disc, and each of the plurality of second grooves penetrate the bottom disc to cut fluid flowing through the centrifugal flow passage in an axial direction of the bottom disc.

In some embodiments of the present disclosure, the atomizing disc further includes a cover body, the cover body cooperating with the bottom disc to cover a plurality of centrifugal flow passages, the cover body being provided with a liquid inlet port facing the liquid inlet space.

The atomizing device according to embodiments in a second aspect of the present disclosure includes: an atomizing disc according to the embodiments in the first aspect of the present disclosure; and a driving motor, a motor shaft of the driving motor cooperating with the atomizing disc to drive the atomizing disc to rotate.

The atomizing device according to the embodiments of the present disclosure is provided with the atomizing disc according to the embodiments in the first aspect of the present disclosure, so that the particle size of droplets discharged from the atomizing device is smaller, and spraying is more uniform, thereby improving the operation efficiency of the atomizing device.

The unmanned aerial vehicle according to embodiments in a third aspect of the present disclosure includes an atomizing device according to the embodiments in the second aspect of the present disclosure.

The unmanned aerial vehicle according to the embodiments of the present disclosure is provided with the atomizing device according to the embodiments in the second aspect of the present disclosure, so that the particle size of droplets discharged from the unmanned aerial vehicle is smaller, and spraying is more uniform, thereby improving the operation effect of the unmanned aerial vehicle.

Additional aspects and advantages of the present disclosure will be set forth in part in the following description. Some will become apparent from the following description, or will be understood by the practice of the present disclosure.

BRIEF DESCRIPTION OF THE DRAWINGS

The accompanying drawings, which constitute a part of this application, are used to provide a further understanding of the present disclosure, and the exemplary embodiments of the present disclosure and the description thereof are used to explain the present disclosure, but do not constitute improper limitations to the present disclosure. In the drawings.

The above and/or additional aspects and advantages of the present disclosure will become apparent and readily understood from the description of the embodiments in conjunction with the accompanying drawings, herein.

Figure 1:
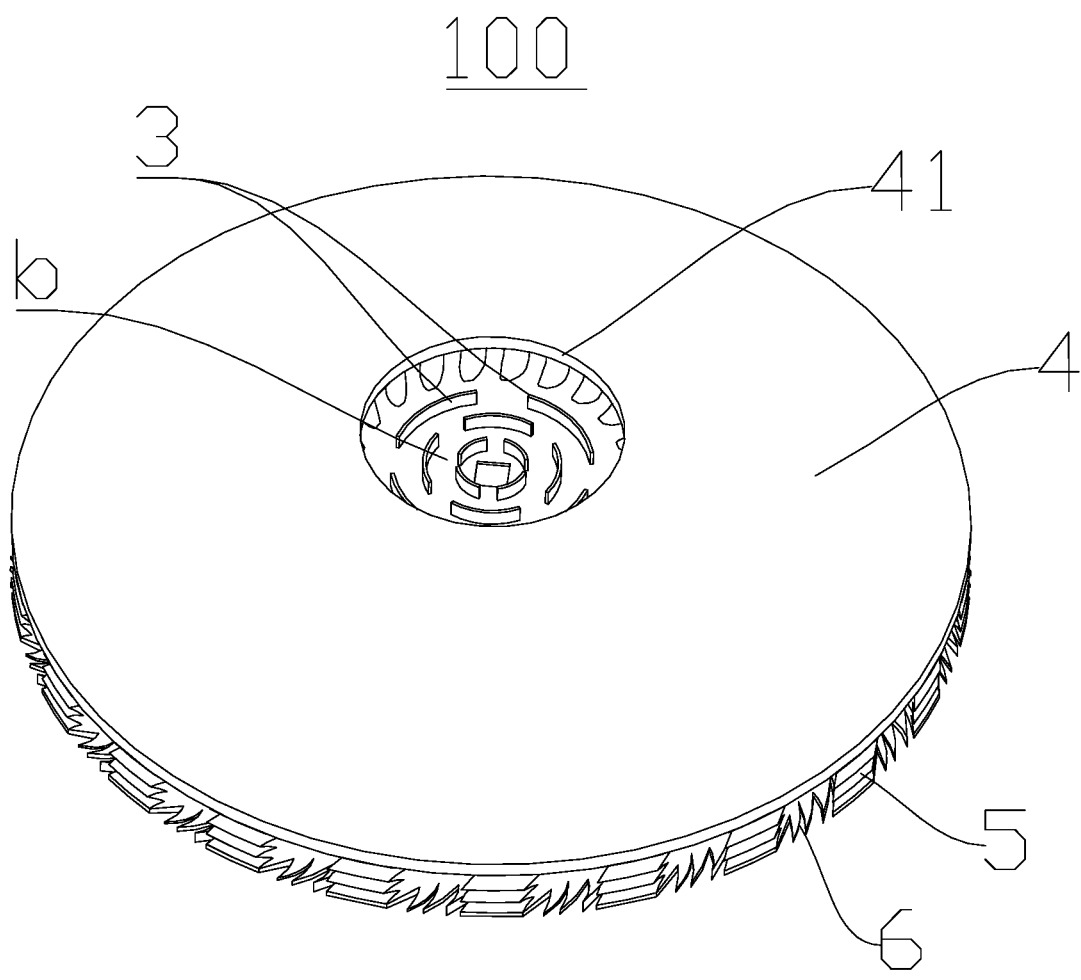
FIG. 1 illustrates a stereogram of an atomizing disc according to embodiments in a first aspect of the present disclosure.

The drawings include the following reference signs:
100, atomizing disc;
1, bottom disc; 2, rib; 3, block group; 31, block; 4, cover body; 41, liquid inlet port; 5, first groove; 51, first wall; 52, second wall; 6, second groove; a, centrifugal flow passage; b, liquid inlet space.

DETAILED DESCRIPTION OF THE EMBODIMENTS

The embodiments of the present disclosure are described in detail below, and the examples of the embodiments are illustrated in the drawings, where the same or similar reference numerals are used to refer to the same or similar elements or elements having the same or similar functions. The embodiments described below with reference to the drawings are intended to be illustrative of the present disclosure and are not to be construed as limiting the present disclosure.

In the descriptions of the present disclosure, it is to be understood that an orientation or positional relationship indicated by the terms "center", "width", "thickness", "up", "down", "left", "right", "bottom", "inside", "outside", "circumference" and the like is an orientation or positional relationship shown in the drawings, and is merely for the convenience of describing the present disclosure and simplifying the description, rather than indicating or implying that the device or elements referred to have a particular orientation, and configure and operate for the particular orientation. Thus, it cannot be construed as limiting the present disclosure. Besides, a feature defined by "first" and "second" may explicitly or implicitly indicate inclusion of one or more features. In the descriptions of the present disclosure, "a plurality" means two or more unless otherwise stated.

In the descriptions of the present disclosure, it is to be noted that unless otherwise specified and limited, terms "mounting", "mutual connection" and "connection" should be generally understood. For example, the term may be fixed connection or detachable connection or integral connection, the term may be mechanical connection or electrical connection, and the term may be direct connection or indirect connection through an intermediate or communication inside two elements. Those of ordinary skill in the art can understand specific implications of the above terms in the present disclosure in specific situations.

An atomizing disc 100 according to an embodiment of the present disclosure will be described below with reference to FIG. 1 to FIG. 7.

As shown in FIG. 1 to FIG. 7, the atomizing disc 100 according to an embodiment of the present disclosure includes a bottom disc 1 and a plurality of ribs 2.

An upper surface of the bottom disc 1 is provided with a liquid inlet space b. The plurality of ribs 2 is disposed on the upper surface of the bottom disc 1 and spaced apart in the circumferential direction of the bottom disc 1. A centrifugal flow passage a in communication with the liquid inlet space b is defined between two adjacent ribs 2 and the bottom disc 1. It can be seen that during an operation of the atomizing disc 100, liquid in the liquid inlet space b flows from the liquid inlet space b into each centrifugal flow passage a under an action of centrifugal force and self-gravity, and is split and atomized during a flow process. Finally, droplets are formed and discharged out of the atomizing disc 100 from an outlet end of the centrifugal flow passage a.

An end of a rib 2, close to an edge of the bottom disc 1, of each of the plurality of ribs 2 is provided with a first groove 5 penetrating a side portion of each of the plurality of ribs 2 so as to cut fluid flowing through the centrifugal flow passage a. It can be seen that when the liquid flows from the liquid inlet space b to the outlet end of the centrifugal flow passage a, the first groove 5 cuts and separates the droplets that are to be discharged from the atomizing disc 100 and flow in the direction of the combined force of centrifugal force and gravity. Therefore, the particle size of the droplets discharged from the atomizing disc 100 is smaller, spraying is more uniform, and the spraying effect of the atomizing disc 100 is improved. It is to be understood that the first groove 5 may penetrate one side of the corresponding rib 2, and the first groove 5 also may penetrate both sides of the corresponding rib 2. As long as the edge of the first groove 5 is in contact with the droplets, the function of cutting and separating the droplets by the first groove 5 can be realized.

The atomizing disc 100 according to the embodiments of the present disclosure is provided with the first groove 5 penetrating a side of a corresponding rib 2 at one end of the corresponding rib 2 close to the edge of the bottom disc 1, so that the particle size of droplets discharged from the atomizing disc 100 is smaller, and spraying is more uniform, thereby improving the spraying effect of the atomizing disc 100.

The atomizing disc 100 according to an embodiment of the present disclosure will be described in detail below with reference to FIG. 1 to FIG. 7.

As shown in FIG. 1 to FIG. 7, the atomizing disc 100 according to an embodiment of the present disclosure includes a bottom disc 1, a plurality of ribs 2, a cover body 4, and a plurality of block groups 3.

As shown in FIG. 1 to FIG. 4, a liquid inlet space b is provided at a center of an upper surface of the bottom disc 1. The plurality of ribs 2 is disposed on the upper surface of the bottom disc 1 and uniformly spaced apart in a circumferential direction of the bottom disc 1. A centrifugal flow passage a in communication with the liquid inlet space b is defined between two adjacent ribs 2 and the bottom disc 1. Each of the plurality of ribs 2 is of an arc shape. In an exemplary embodiment, each of the plurality of ribs 2 is formed in a three-dimensional spiral shape and the bending directions of the plurality of ribs 2 are the same.

In an exemplary embodiment, each of the plurality of ribs 2 is of arc-shaped or linear, one end of each of the plurality of ribs 2 is located at the liquid inlet space b, and the other end of each of the plurality of ribs 2 is located at the edge of the bottom disc 1.

As shown in FIG. 1 to FIG. 3A and FIG. 7, each of first grooves 5 on the plurality of ribs penetrates two opposite sides of the corresponding rib 2. Each of the first grooves 5 penetrates the corresponding rib 2 in the circumferential direction of the bottom disc 1. Thus, each of the first grooves 5 can cut and separate droplets discharged from the centrifugal flow passages a on both sides of the corresponding rib 2. It can be seen that the ribs 2 are strip-shaped, and along the extending direction of the rib 2, two ends of the rib 2 are respectively a first end 53 and a second end 54; the first end 53 of the rib 2 is located at the liquid inlet space b, and the second end 54 of the rib 2 is located at the edge of the bottom disc 1. Furthermore, the side of the rib 2 refers to two sides 55 of the rib 2 along the circumferential direction of the bottom disc 1.

In an exemplary embodiment, the rib 2 is provided with a first side wall and a second side wall opposite to each other, one end of the first groove 5 extends to the first side wall, and the other end of the first groove 5 extends to the second side wall, wherein a notch of the first groove 5 is disposed away from the liquid inlet space b. Besides, an opening of the first groove 5 is gradually increased in a direction away from the upper surface of the bottom disc 1.

As shown in FIG. 1 to FIG. 3 and FIG. 7, the first groove 5 is a strip groove, and an extending direction of the first groove 5 is inclined to the upper surface of the bottom disc 1. The first groove 5 is arranged obliquely with respect to the bottom disc 1, and a direction from a side of the first groove 5 away from the center of curvature of the corresponding rib 2 to a side of the first groove 5 close to the center of curvature of the rib 2 is a direction away from the bottom disc 1. That is, the first groove gradually extends away from the bottom disc in a direction from a side of the first groove away from the center of curvature of the corresponding rib to a side of the first groove close to the center of curvature of the rib.

Figure 3:
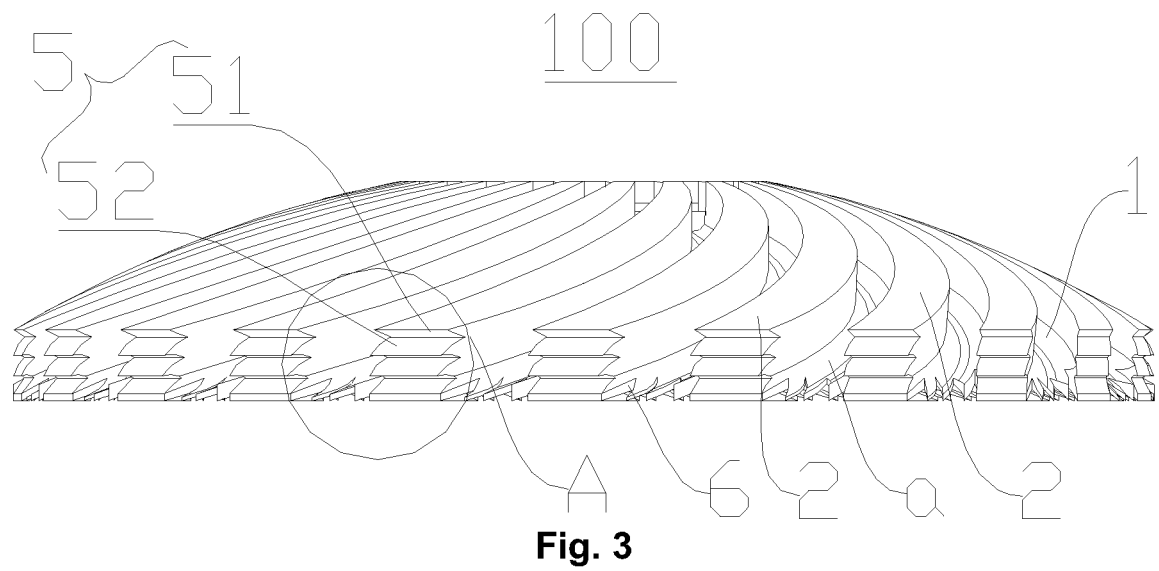
FIG. 3 illustrates a front view of the atomizing disc in FIG. 2.
Figure 3A:
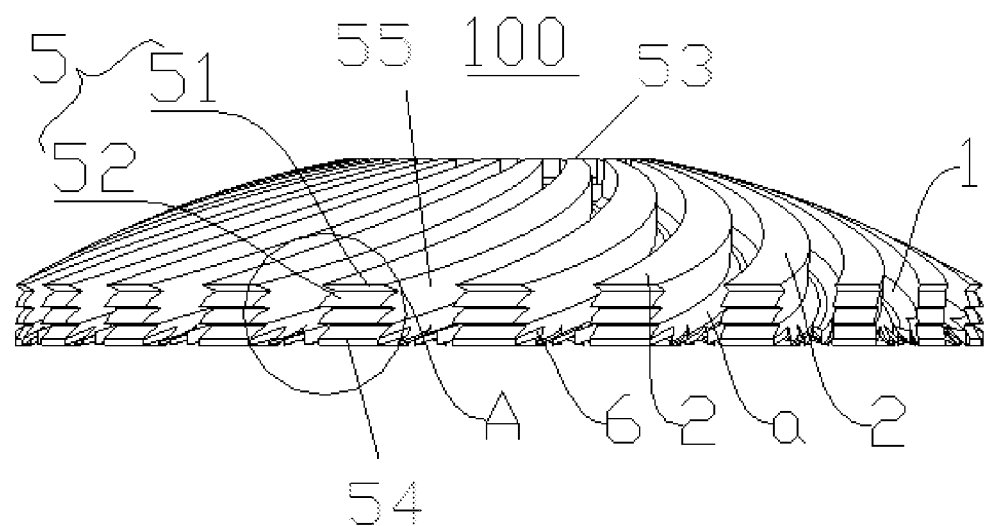
FIG. 3A illustrates a front view of the atomizing disc in FIG. 2.
Figure 7:
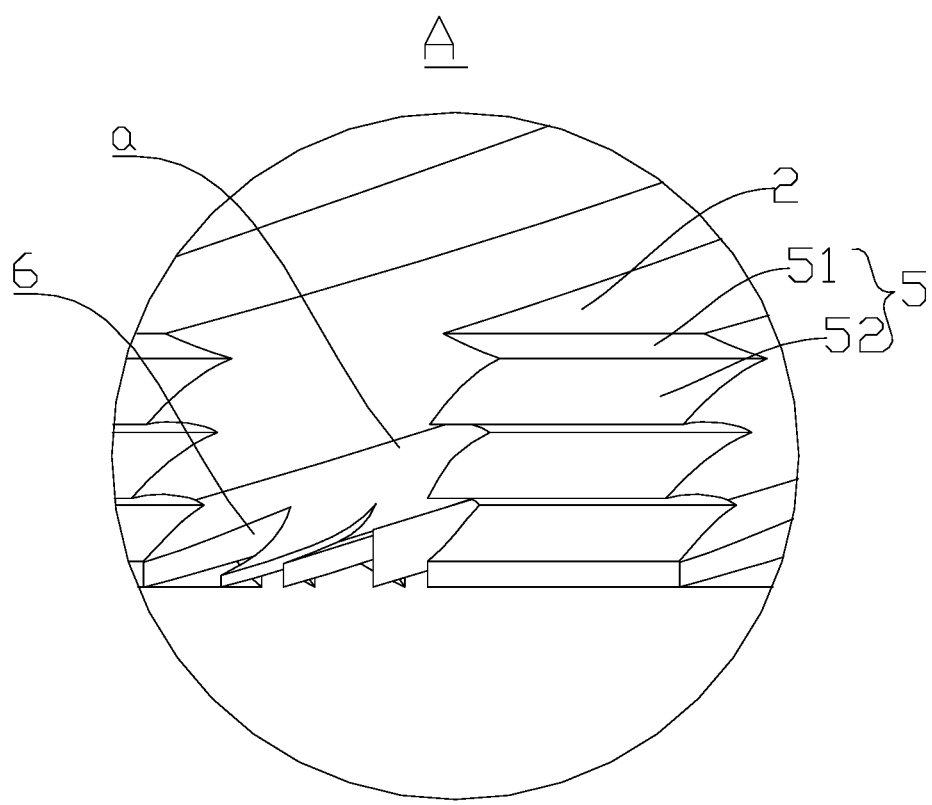
FIG. 7 illustrates a partial enlarged view of a portion A in FIG. 3.

For example, as shown in FIG. 3 and FIG. 7, the direction of the first groove 5 away from the bottom disc 1 is directed to the upper left from the lower right of the corresponding rib 2. In an exemplary embodiment, the first groove 5 is disposed away from the bottom disc 1 gradually in a rotation direction of the bottom disc 1.

As shown in FIG. 3 and FIG. 7, an opening of an end of each of the first grooves 5 close to the bottom disc 1 is smaller than an opening of the first groove 5 away from the bottom disc 1. Thus, the effects of cutting and separating the droplets by the first groove 5 can be enhanced.

For example, as shown in FIG. 3 and FIG. 7, the first groove 5 is of V-shaped.

As shown in FIG. 3 and FIG. 7, each of the first grooves 5 includes a first wall 51 and a second wall 52 opposite to each other, the first wall 51 and the second wall 52 are adjacent to the end of the corresponding rib with the first groove 5, the second wall 52 is close to the upper surface of the bottom disc 1 with respect to the first wall 51, and the second wall 52 extends away from the center of the bottom disc 1 and close to the upper surface of the bottom disc 1.

In an exemplary embodiment, the first wall and the second wall are both arc-shaped walls or planar walls.

As shown in FIG. 1 to FIG. 3 and FIG. 7, each of the plurality of ribs 2 is provided with three first grooves 5 which are sequentially arranged in a thickness direction of the rib 2. Thus, the particle size of the droplets discharged from the atomizing disc 100 can be smaller, and the atomizing disc 100 can spray liquid more uniformly, thereby improving the spraying effect of the atomizing disc 100.

As shown in FIG. 1 to FIG. 4 and FIG. 7, an outlet end of the centrifugal flow passage a is provided with a plurality of second grooves 6, the plurality of second grooves 6 are sequentially arranged in the circumferential direction of the bottom disc, and each of the plurality of second grooves 6 penetrate the bottom disc 1 to cut fluid flowing through the centrifugal flow passage a in an axial direction of the bottom disc 1. It can be seen that when the liquid flows from the liquid inlet space b to the outlet end of the centrifugal flow passage a, the plurality of second grooves 6 may cut and separate the droplets that are to be discharged from the atomizing disc 100 and fall down. Therefore, the particle size of the droplets discharged from the atomizing disc 100 is smaller, spraying is more uniform, and the spraying effect of the atomizing disc 100 is improved.

In an exemplary embodiment, an opening of each of the plurality of second grooves 6 is gradually increased in a direction away from the liquid inlet space b. The second groove 6 is a V-shaped groove composed of two groove walls, and the two groove walls of the second groove 6 are both arc-shaped groove walls or planar groove walls.

Figure 5:
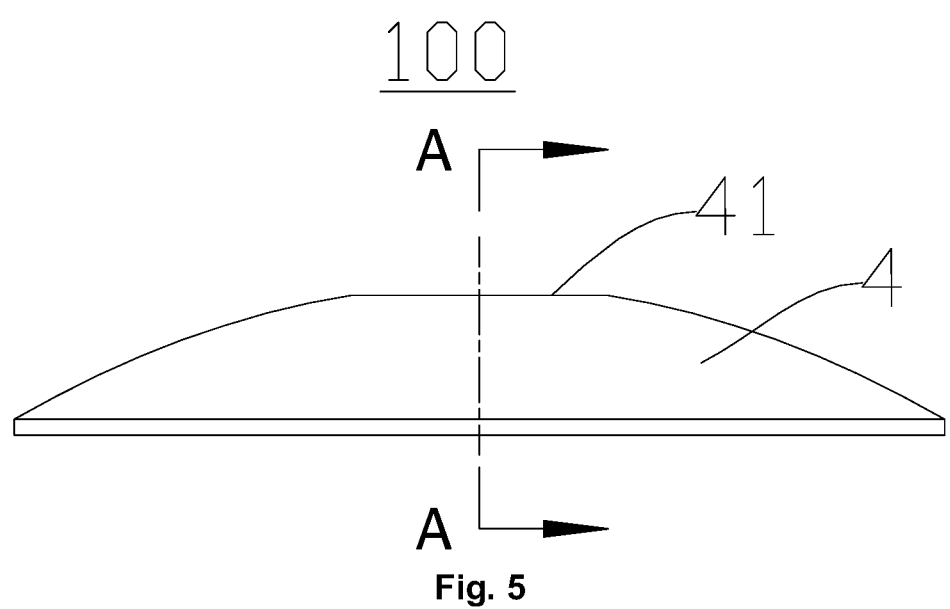
FIG. 5 illustrates a front view of a cover body according to embodiments in a first aspect of the present disclosure.
Figure 6:
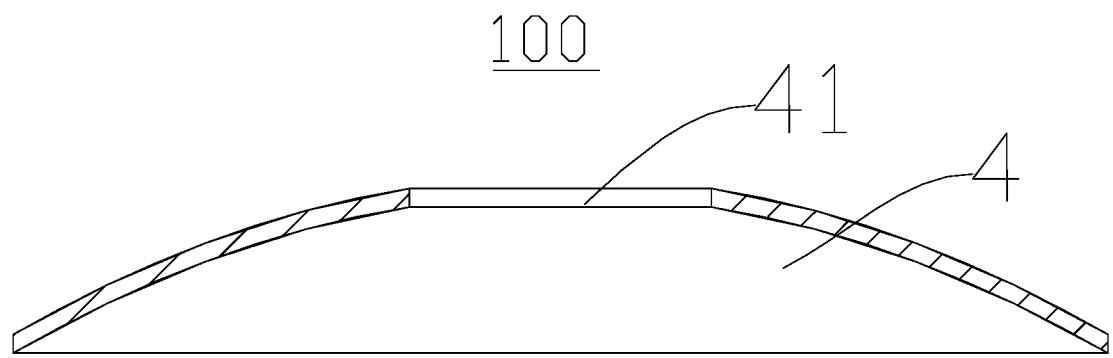
FIG. 6 illustrates a sectional view of a direction A-A in FIG. 5.

As shown in FIG. 5 and FIG. 6, in an exemplary embodiment, the cover body 4 has the same shape as an outer peripheral wall of the bottom disc 1 to cooperate with the bottom disc 1, so as to cover a plurality of centrifugal flow passages a. Further, the centrifugal flow passage a can be sealed. When liquid flows in the centrifugal flow passage a, since an inner wall of the cover body 4 has a certain blocking effect on the flowing liquid, a flow direction of the liquid is tangential to a generatrix of the inner wall of the cover body 4. Moreover, it is known from the Coanda Effect that the liquid in the atomizing disc 100 flows along the surface of the bottom disc 1 due to fluid viscosity. Thus, under the joint action of the cover body 4 and the bottom disc 1, an initial velocity of the droplets discharged from the atomizing disc 100 can be increased, and the flow direction of the droplets can be more uniform, thereby increasing the controllability of the droplets, reducing the phenomenon of drift during falling of the droplets due to the influence of cross wind, and improving the spraying effect of the atomizing disc 100.

The cover body 4 is provided with a liquid inlet port 41 facing the liquid inlet space b. It can be seen that a user can make liquid to be sprayed flow into the liquid inlet space b of the atomizing disc 100 by the liquid inlet port 41.

As shown in FIG. 3, the bottom disc 1 is formed as an axisymmetric body, and the center of curvature of the generatrix of the bottom disc 1 is located on a side, close to the center of the bottom disc 1, of the generatrix of the bottom disc 1, that is, the generatrix of the bottom disc 1 is formed into a conical curve. Therefore, the structure of the bottom disc 1 is simple and stable. When the liquid in the liquid inlet space b is discharged from the atomizing disc 100 along the centrifugal flow passage a, a larger initial velocity is obtained due to the centrifugal force, the spraying area of the droplets discharged from the atomizing disc 100 is increased, the phenomenon of drift during falling of the droplets due to the influence of cross wind is reduced, and the spraying effect of the atomizing disc 100 is improved.

Figure 2:
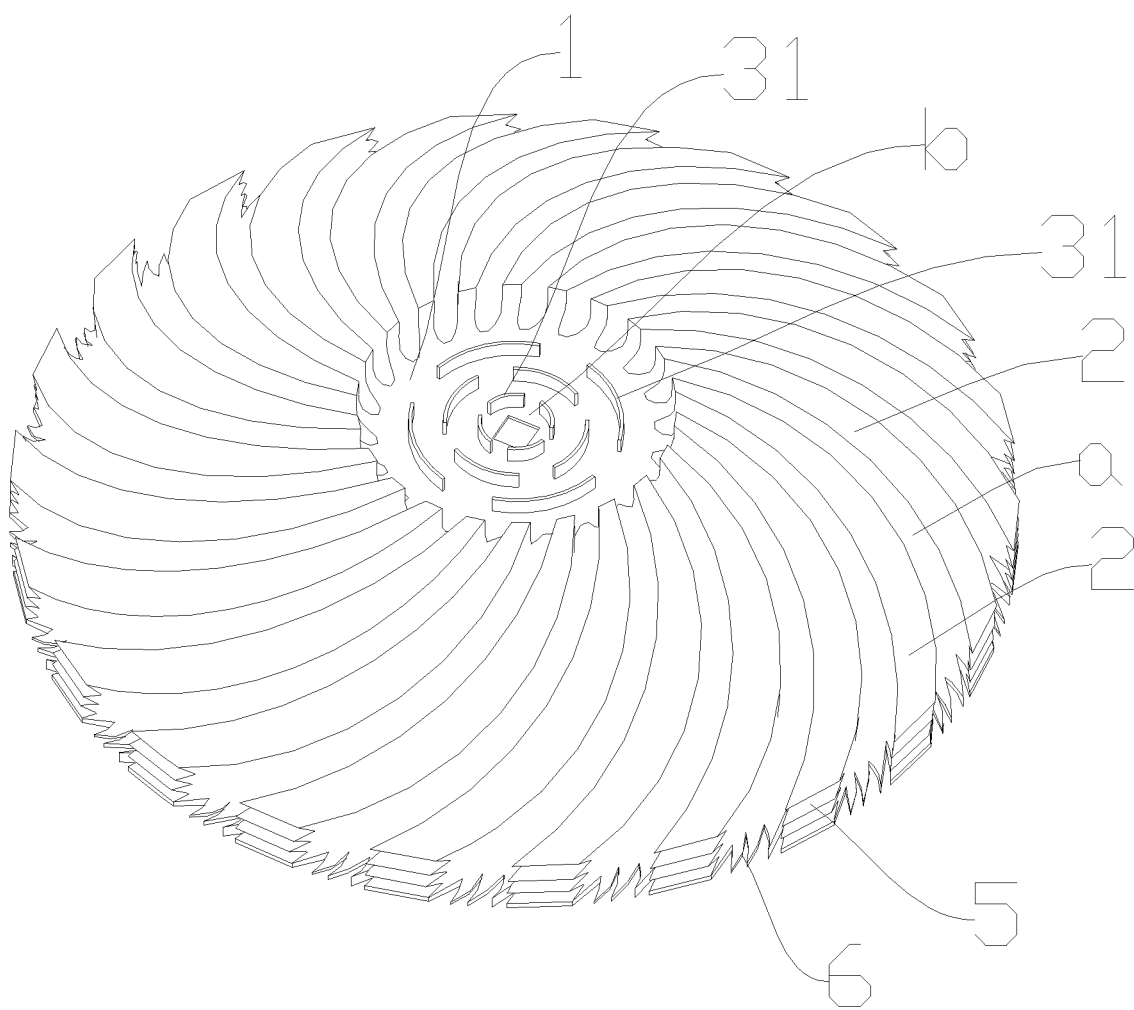
FIG. 2 illustrates a partial stereogram of an atomizing disc according to embodiments in a first aspect of the present disclosure.
Figure 4:
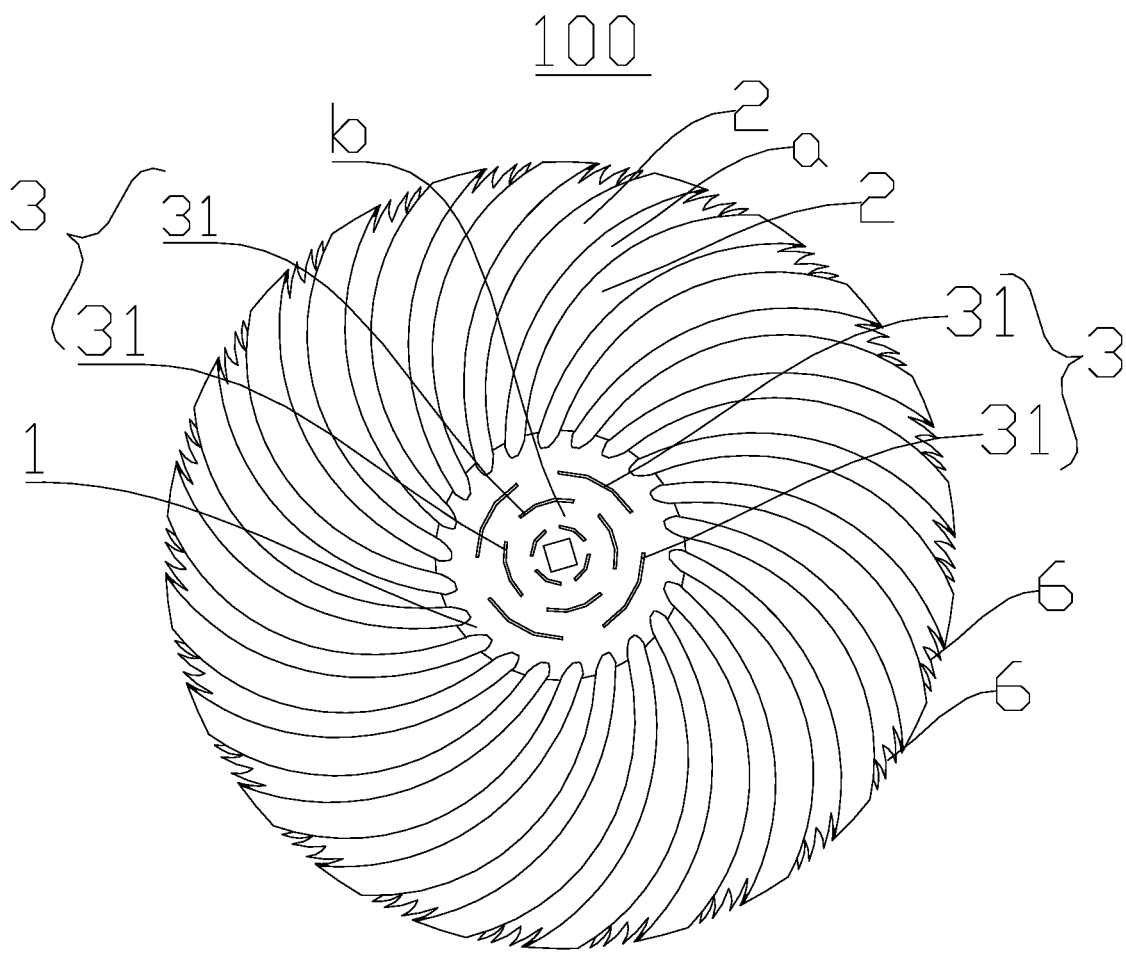
FIG. 4 illustrates a top view of the atomizing disc in FIG. 2.

As shown in FIG. 1, FIG. 2, and FIG. 4, a plurality of block groups 3 is disposed in the liquid inlet space b and spaced apart in a radial direction of the bottom disc 1. Each block group 3 includes a plurality of blocks 31, the plurality of blocks 31 of each block group 3 being uniformly spaced apart in the circumferential direction of the bottom disc 1 to be arranged in an annular structure with an opening, and openings of two adjacent block groups 3 being staggered in the circumferential direction of the bottom disc 1. Thus, the liquid in the liquid inlet space b is first uniformly spread in the liquid inlet space b under the centrifugal force provided by the atomization disc 100, and then the liquid flows to the plurality of centrifugal flow passages a along the opening defined by each of the block groups 3, so that the particle size of the droplets discharged from the atomizing disc 100 can be more uniform, the particle size distribution of the droplets is more concentrated, and the spraying effect of the atomizing disc 100 is improved.

The bottom disc 1, the plurality of ribs 2 and the plurality of block groups 3 are formed as an integrally formed plastic material. Thus, the manufacturing cost of the atomizing disc 100 can be reduced, and the manufacture of the atomizing disc 100 can be simple and convenient. Moreover, in a manufacturing process of the atomizing disc 100, the arrangement of the centrifugal flow passage a with a U-shaped cross section allows plastics in a molten state to be easily flowed and molded, and thus easy to mold.

As shown in FIG. 3 and FIG. 7, each of the centrifugal flow passages a has a U-shaped cross section. Therefore, it can be seen that the centrifugal flow passage a has a simple structure. When the liquid in the liquid inlet space b is doped with solid particles, the centrifugal flow passage a with the U-shaped cross section facilitates the solid particles to smoothly pass through the centrifugal flow passage a and to be discharged from the atomizing disc 100, thereby improving the working efficiency of the atomizing disc 100 to a certain extent, and also facilitating the user to clean the atomizing disc 100. In the manufacturing process of the atomizing disc 100, it is easy to open the mold.

As shown in FIG. 2 to FIG. 4, each of the centrifugal flow passages a is formed into an arc-shaped flow passage. The arc-shaped flow passage can make the liquid in the liquid inlet space b have a long acceleration distance, and the droplets discharged from the atomizing disc 100 can obtain a large centrifugal force and an initial velocity. Thus, the particle size distribution of the droplets discharged from the atomizing disc 100 is concentrated, the average particle size of the droplets is small, the spraying area of the discharged droplets of the atomizing disc 100 is increased, the phenomenon of drift during falling of the droplets due to the influence of cross wind is reduced, and the spraying effect of the atomizing disc 100 is improved.

As shown in FIG. 2 and FIG. 4, the width of each of the centrifugal flow passages a gradually increases in the direction from the center of the bottom disc 1 to the edge of the bottom disc 1. Thus, the spraying range of the atomizing disc 100 can be increased to a certain extent, thereby improving the working efficiency of the atomizing disc 100.

As shown in FIG. 2 to FIG. 4, the plurality of centrifugal flow passages a have the same structure and size in the circumferential direction of the bottom disc 1. Thus, the structure of the atomizing disc 100 is simple and stable. It is advantageous to ensure that the droplets of the atomizing disc 100 discharged along the plurality of centrifugal passages a have the same particle size and the same initial velocity, and thus the droplets discharged from the atomizing disc 100 are sprayed more uniformly, which is advantageous for improving the spraying effect of the atomizing disc 100.

The assembly process of the atomizing disc according to an embodiment of the present disclosure is described below.

The cover body 4 is mounted on the bottom disc 1 to cover the plurality of centrifugal flow passages a.

The beneficial effects of the atomizing disc 100 according to an embodiment of the present disclosure are briefly described below.

The atomizing disc 100 according to an embodiment of the present disclosure can make the mold opening of the atomizing disc 100 simple during the manufacturing process, and facilitate the solid particles to smoothly pass through the centrifugal flow passage a and to be discharged from the atomizing disc 100, so that the user can conveniently clean the atomizing disc 100. Moreover, the particle size distribution of the droplets discharged from the atomizing disc 100 is concentrated, the average particle size is small, the initial velocity is large, the spraying area of the atomizing disc 100 can be increased, the phenomenon of drift during falling of the droplets due to the influence of cross wind is reduced, and the spraying effect of the atomizing disc 100 is improved.

Other variants of the atomizing disc according to an embodiment of the present disclosure are briefly described below.

1: Each of the ribs 2 is linear, and the first groove 5 is inclined with respect to the bottom disc 1.

2: Each of the first grooves 5 penetrates a side of the corresponding rib 2 away from the center of curvature of the rib 2.

An atomizing device according to an embodiment of the present disclosure is described below.

The atomizing device (not shown) according to an embodiment of the present disclosure includes an atomizing disc 100 according to the aforementioned embodiments of the present disclosure and a driving motor (not shown). A motor shaft (not shown) of the driving motor cooperates with the atomizing disc 100 to drive the atomizing disc 100 to rotate. It can be seen that the atomizing disc 100 is rotated by the driving of the driving motor, so that the liquid in the liquid inlet space b flows along the centrifugal flow passage a and gradually forms droplets to be discharged from the atomizing disc 100.

The atomizing device according to the embodiments of the present disclosure is provided with the atomizing disc 100 according to the embodiments of the present disclosure, so that the particle size of droplets discharged from the atomizing device is smaller, and spraying is more uniform, thereby improving the operation efficiency of the atomizing device.

An unmanned aerial vehicle according to an embodiment of the present disclosure is described below.

The unmanned aerial vehicle according to an embodiment of the present disclosure includes an atomizing device according to the above embodiments of the present disclosure.

The unmanned aerial vehicle according to the embodiments of the present disclosure is provided with the atomizing device according to the embodiments of the present disclosure, so that the particle size of droplets discharged from the unmanned aerial vehicle is smaller, and spraying is more uniform, thereby improving the operation effect of the unmanned aerial vehicle.

In the descriptions of the specification, the descriptions made with reference to terms "an embodiment", "some embodiments", "exemplary embodiment", "example", "specific example", "some examples" or the like refer to that specific features, structures, materials or characteristics described in combination with the embodiment or the example are included in at least one embodiment or example of the present disclosure. In the present specification, the schematic representation of the above terms does not necessarily mean the same embodiment or example. Furthermore, the specific features, structures, materials, or characteristics described may be combined in a suitable manner in any one or more embodiments or examples.

While the embodiments of the present disclosure have been shown and described, those of ordinary skill in the art may understand that various modifications, changes, substitutions and variations of the embodiments may be made without departing from the spirit and scope of the present disclosure. The scope of the present disclosure is defined by the claims and their equivalents.

What is claimed is:

1. An atomizing disc, comprising:
   a bottom disc, an upper surface of the bottom disc being provided with a liquid inlet space; and
   a plurality of ribs, the plurality of ribs being disposed on the upper surface of the bottom disc and being spaced apart in a circumferential direction of the bottom disc, a centrifugal flow passage in communication with the liquid inlet space being defined between two adjacent ribs and the bottom disc, and an end, at an edge of the bottom disc, of each of the plurality of ribs being provided with a plurality of first grooves penetrating a side portion of the each of the plurality of ribs so as to cut fluid flowing through the centrifugal flow passage, wherein each of the plurality of first grooves is sequentially arranged in a thickness direction of a corresponding rib in the plurality of ribs, wherein each of the plurality of ribs is of arc-shape or linear, one end of the each of the plurality of ribs is located at the liquid inlet space, and the other end of the each of the plurality of ribs is located at the edge of the bottom disc.

2. The atomizing disc as claimed in claim 1, wherein each of the plurality of ribs is of an arc shape, and each of the plurality of first grooves penetrates a side, away from a center of curvature of a rib corresponding to the each of the plurality of first grooves, of a corresponding rib in the plurality of ribs.

3. The atomizing disc as claimed in claim 2, wherein each of the plurality of first grooves is arranged obliquely with respect to the bottom disc, and each of the plurality of first grooves gradually extends away from the bottom disc in a direction from a side of the respective first groove away from the center of curvature of the corresponding rib to a side of the respective first groove close to the center of curvature of the corresponding rib.

4. The atomizing disc as claimed in claim 1, wherein each of the plurality of ribs is linear.

5. The atomizing disc as claimed in claim 4, wherein each of the plurality of first grooves is arranged obliquely with respect to the bottom disc.

6. The atomizing disc as claimed in claim 1, wherein the each of the plurality of ribs is of an arc shape, each of the plurality of first grooves is disposed obliquely with respect to the bottom disc, and each of the plurality of first grooves extends away from the bottom disc in a direction from a side of the respective first groove away from a center of curvature of the corresponding rib to a side of the respective first groove closer to the center of curvature of the corresponding rib, an opening of an end, closer to the bottom disc, of each of the plurality of first grooves, is smaller than an opening, away from the bottom disc, of the each of the plurality of first grooves.

7. The atomizing disc as claimed in claim 6, wherein each of the first grooves comprises a first wall and a second wall opposite to each other, the first wall and the second wall are adjacent to the end of the corresponding rib with the respective first groove, the second wall is closer to the upper surface of the bottom disc with respect to the first wall, and the second wall extends away from a center of the bottom disc and toward the upper surface of the bottom disc.

8. The atomizing disc as claimed in claim 7, wherein the first wall and the second wall are both arc-shaped walls or planar walls.

9. The atomizing disc as claimed in claim 1, wherein each of the plurality of first grooves on the plurality of ribs penetrates two opposite sides of a corresponding rib in the plurality of ribs.

10. The atomizing disc as claimed in claim 1, wherein an outlet end of the centrifugal flow passage is provided with a plurality of second grooves, wherein the plurality of second grooves are sequentially arranged in the circumferential direction of the bottom disc, and each of the plurality of second grooves penetrates the bottom disc to cut fluid flowing through the centrifugal flow passage in an axial direction of the bottom disc.

11. The atomizing disc as claimed in claim 10, wherein an opening of each of the plurality of second grooves is gradually increased in a direction away from the liquid inlet space.

12. The atomizing disc as claimed in claim 10, wherein each of the plurality of second grooves is a V-shaped groove comprising two groove walls, and the two groove walls of the second groove are both arc-shaped groove walls or planar groove walls.

13. The atomizing disc as claimed in claim 1, further comprising a cover body, the cover body cooperating with the bottom disc to cover a plurality of centrifugal flow passages, the cover body being provided with a liquid inlet port facing the liquid inlet space.

14. The atomizing disc as claimed in claim 1, wherein each of the plurality of first grooves is a strip groove, and an extending direction of each of the plurality of first grooves is inclined to the upper surface of the bottom disc.

15. The atomizing disc as claimed in claim 14, wherein each of the plurality of ribs comprises a first side wall and a second side wall opposite to each other, one end of each of the plurality of first grooves extends to the first side wall, and the other end of each of the plurality of first grooves extends to the second side wall, a notch of each of the plurality of first grooves being disposed away from the liquid inlet space.

16. The atomizing disc as claimed in claim 14, wherein an opening of each of the plurality of first grooves is gradually increased in a direction away from the upper surface of the bottom disc.

17. An atomizing device, comprising:
   an atomizing disc as claimed in claim 1; and
   a driving motor, a motor shaft of the driving motor cooperating with the atomizing disc to drive the atomizing disc to rotate.

18. An unmanned aerial vehicle, comprising an atomizing device as claimed in claim 17.

* * * * *